United States Patent [19]
Amagi et al.

[11] 3,856,574
[45] Dec. 24, 1974

[54] ELECTRODE AND METHOD OF MANUFACTURE

[75] Inventors: Yasuo Amagi; Zenya Skiiki, both of Tokyo, Japan

[73] Assignee: Kureha Kagaku Kogyo Kabushiki Kaisha, Toyko, Japan

[22] Filed: Feb. 2, 1972

[21] Appl. No.: 223,026

[30] Foreign Application Priority Data
Feb. 3, 1971  Japan.................................. 46-3776

[52] U.S. Cl............ 136/120 FC, 136/121, 204/294, 252/502, 264/105
[51] Int. Cl. .......................................... H01m 13/00
[58] Field of Search ............ 252/502, 511; 264/105, 264/29; 136/121 C, 120 FC; 161/DIG. .005; 204/299

[56] References Cited
UNITED STATES PATENTS
2,310,108   2/1943   Moberly............................. 252/502
3,175,918   3/1965   McGahan et al. .................... 106/41

OTHER PUBLICATIONS

Chemical Abstracts, Vol. 73, Col. 110604q (1970), (Re Ger. Off. 1963325).

Primary Examiner—John D. Welsh
Attorney, Agent, or Firm—Lane, Aitken, Dunner & Ziems

[57]              ABSTRACT

A porous carbon electrode containing a plurality of hollow carbon micro-spheres dispersed in a carbonized matrix. A process for producing same which includes mixing hollow carbon micro-spheres with a thermo-setting resin or a high polymer, molding the mixture to provide a green carbon electrode body, baking and carbonizing the body, followed by an activation treatment.

3 Claims, No Drawings

ELECTRODE AND METHOD OF MANUFACTURE

BACKGROUND OF THE INVENTION

This invention relates to a process for producing a porous carbon electrode and to the carbon electrode so produced. The electrode is suitable for use in fuel cells, air cells and the like.

Heretofore, the carbon electrodes used in fuel cells and air cells have been produced by mixing activated charcoal powder with a binder, followed by molding and baking or by applying carbon black to the surfaces of a screen made of platinum or like metal. However, the carbon electrodes of the prior art have relatively small surface areas and low current density per unit area, besides the poor rigidity and poor permeability for the penetrant, if used, because of difficulties in controlling the uniform distribution of the pores having substantially the same diameter.

Accordingly, there exists a need in the art for a porous carbon electrode combining the qualities of a high surface-to-weight ratio, low bulk density, compactness, high efficiency, long service life, and high current density.

SUMMARY OF THE INVENTION

This invention relates to a porous carbon electrode having a high surface-to-weight ratio, low bulk density, compactness, high efficiency, long service life, and high current density. The carbon electrode of the present invention is formed with hollow carbon micro-spheres which provide therein uniformly distributed pores of diameters that are substantially the same. The electrode has a moderate tortuosity, i.e., the maximum lengths of the minute passages formed of pores having moderate diameters with the minimum likelihood of clogging of the pores. This, in turn, provides for such a carbon electrode a large effective surface area in combination with a high degree of permeability and a high mechanical strength. The porous structure which is obtained from the hollow carbon micro-spheres allows a ready but deeper permeation by a penetrant.

This invention also relates to a process for the production of such an electrode. The process of the present invention includes the steps of mixing hollow carbon micro-spheres with a binder, molding the mixture so prepared to provide a green carbon body for the electrode, baking and carbonizing that body, followed by an activation treatment.

Accordingly, it is an object of the present invention to provide an improved carbon electrode and method of producing same.

It is a further object of the present invention to provide a process for producing a porous carbon electrode having a relatively low bulk density, a moderately porous structure and which allows a relatively high current density.

It is another object of the invention to provide a carbon electrode which is light in weight and compact in size, and which will give a relatively long service life.

It is another object of the present invention to provide a porous carbon electrode formed from hollow carbon micro-spheres.

Other objects and further scope of applicability of the present invention will become apparent from the detailed description to follow.

DESCRIPTION OF THE PREFERRED EMBODIMENTS

The hollow carbon micro-spheres used in the electrode of the present invention preferably have a grain diameter of 5 to 100$\mu$, a wall thickness of 0.5 to 25$\mu$, and are composed of a hard carbon. Too small a grain diameter results in a small pore diameter which will result in an electrode having poor gas diffusibility. If the grain diameter is too large, the rate of gas diffusion through the electrode will be too high. If the wall thickness of the micro-spheres is too small, then a lower strength will result. If the wall thickness of the micro-spheres is too great, difficulty will be experienced in activation of electrode. The process for producing such hollow carbon micro-spheres starts with a pitch which is first dispersed into small spheres, then foamed, "infusiblized," baked and carbonized. The process for the preparation of these hollow carbon micro-spheres is more fully disclosed in our U.S. application Ser. No. 147,712 filed May 27, 1971, now U.S. Pat. No. 3,786,134, the teachings of which are herein incorporated by reference.

Suitable binders which may be used in the manufacture of the electrode include thermo-setting resins and carbonizable high polymers. The former include phenolic resins, furfuryl alcohol resins, imide resins, silicone resins, epoxy resins, furan resins and urethane resins. The latter include polyvinyl chloride, polyvinylidene base resins, poly-vinylidene fluoride, polyacrylonitrile, polyvinyl alcohol, starch, caramel, millet jelly, etc. In using such thermo-setting resins or carbonizable high polymers, a hardener or solvent may be added as required.

The process for producing the porous carbon electrode of the present invention includes molding, baking, activation and finishing steps. In the first step, molding, hollow carbon micro-spheres and binders are selected according to the required physical properties, e.g., uniformity of pore distribution, activity, strength, etc. The mixing ratio of the hollow carbon micro-spheres to the binder is also determined according to the desired physical properties. Although the mixing ratio may vary with the desired properties of the electrodes, the mixing ratio of the hollow carbon micro-spheres to the binder should preferably be within the range from 100:5 to 100:60 by weight. If the amount of the binder is less than the above range, a weak structure will be obtained with resultant clogging of the pores which, in turn, will cause difficulties in baking and activation. The intimate mixture of the hollow carbon micro-spheres and binder is placed in a metal mold and subjected to pressure and heat. If required, the material may be subjected to further heating to insure the maximum hardness. The molding pressure may vary with the required physical properties of the carbon electrode, but, in general, it should preferably be below 50 kg/cm$^2$. If the molding pressure exceeds the above limit, then pore clogging produced by breakage of the hollow carbon micro-spheres is likely to occur. In the baking step, the molded body obtained by mixing the hollow carbon micro-spheres with the binder is subjected to carbonization. For carbonization, the molded or green carbon body made from the hollow carbon micro-spheres is heated in a non-oxidizing atmosphere. The non-oxidizing atmosphere may include inert gases such as $N_2$, Ar or He. A carbonizing atmosphere may also be obtained by covering the green carbon with coke powder or the like, or by a vacuum. It is preferred to heat the green carbon to about 1,000°C at a heating rate of 20°C/hour to 200°C/hour. If the heating rate is too high, there will result a failure, or cracking, of the product. Conversely, if the heating rate is too low, then the production efficiency will suffer. If required, the product thus obtained may be subjected to further heat treatment at a constant temperature of 850°C to 2,000°C to insure the maximum carbonization. In the third step, the activation step, the product which has been subjected to baking and carbonization is then oxidized so as to roughen the surface and thereby enlarge the surface area. This treatment enhances the activation efficiency. The preferred activating processes include a low temperature activating process (exothermic gas activation), an elevated temperature activating process (endothermic gas activation) and a chemical activation process using an oxidizer. The low temperature gas activating process oxidizes the material in an oxidizing gas atmosphere within a low temperature range from room temperature to 600°C. Suitable oxidizing gasses include $O_2$, $Cl_2$, $NO_2$, and air and mixtures of these gases with inert gases such as $N_2$, Ar, He, etc. From the viewpoint of economics, air or a mixture of air with $N_2$ is preferred. The activating temperatures may vary with the types, concentrations or flow rates of the oxidizing gas used; for example, if air is used, then a range of from 300°C to 400°C is preferred. The elevated temperature gas activating process oxidizes the material in an oxidizing gas atmosphere at temperatures ranging from 700°C to 1,000°C. Illustrative of suitable oxidizing gases for this latter process are steam, $CO_2$ and mixtures of these gases with inert gases. If steam, $CO_2$ or a mixture of these gases with inert gases is used, it is preferably to use a temperature within the range of from 800°C to 900°C. The chemical activating process treats the carbonized porous products with an oxidizer and then subjects to heat for activation. Oxidizers suitable for use in the chemical process include nitric acid, phosphoric acid, concentrated sulfuric acid, dichromate solution and permanganate solution. Preferably, the heat treatment should be carried out at temperatures of 300°C to 900°C. The carbonized hollow carbon micro-sphere body obtained by the steps of molding, baking and activation has been found to possess the following physical properties:

| | |
|---|---|
| Average pore diameter | 0.5 to 20 $\mu$ |
| Porosity | 5 to 50 % |
| Bulk density | 0.2 to 0.9 g/cc |
| Surface-to-weight ratio | 600 to 2000 $m^2/g$ |
| Compressive strength | 20 to 400 $kg/cm^2$ |

The final step consists essentially of catalyst deposition and water proofing treatment. If the activated hollow micro-sphere carbon is to be used as an anode for an air cell, the deposition of a catalyst is not necessary. If the carbonized hollow carbon micro-sphere product is to be used as an electrode for a fuel cell, particularly a hydrogen-oxygen cell, no further treatment is necessary; however, preferably, catalysts such as platinum, silver, osmium or the like are deposited on it according to a conventional process. If the product is to be used as a cathode for a hydrogen-oxygen cell, a platinum catalyst is preferably deposited on it by a conventional process. In the preferred embodiment, the activated hollow carbon micro-sphere product, after catalyst deposition, is subjected to a water proofing treatment using a water repellant such as paraffin, polyethylene, vaseline, silicon resin or the like.

The following examples for preparation and use of the electrode of this invention are presented for the purpose of more fully illustrating the invention and are not intended as a limitation on the scope of the invention.

EXAMPLE 1

Following the process as is disclosed in United States Application Ser. No. 147,712, filed May 27, 1971, a petroleum base pitch was dispersed into small spheres, foamed, "infusibilized," baked and carbonized (at a temperature of 850°C) to produce hollow carbon micro-spheres. The hollow carbon spheres so produced were then screened and those having grain diameters of 10 to 46$\mu$ and wall thickness of 2 to 6$\mu$ were retained. 100 parts by weight, of hollow carbon micro-spheres were mixed in a V-type mixer with 25 parts by weight of a commercially available Novolak resin containing a hardener (GUNEI-KAGAKU make, GP-2000 H). The resulting mixture was placed in a metal mold having dimensions of 150 mm × 150 mm × 200 mm and subjected to a pressure of 5 $kg/cm^2$, followed by heating at a temperaure of 180°C for 45 minutes to produce a thermo-set. The molded body was then dried in a dryer at a temperature of 150°C for 10 hours to complete the thermo-set. The material thus thermally set was then heated in an atmosphere of $N_2$ gas at a heating rate of 50°C/hour from 200°C up to 850°C, followed by further heating at a temperature of 850°C for 4 hours to complete the baking and carbonization treatment.

Subsequently, the porous carbon product thus obtained was machined to produce a pipe having an inner diameter of 30 mm and an outer diameter of 50 mm. This pipe was then dried in a dryer, through which air was circulated at a temperature of 350°C, for 75 hours to effect the activating treatment. The physical properties of the activated porous carbon pipe thus obtained were determined to be as follows:

| | |
|---|---|
| Average diameter of the pores | 4.6 $\mu$ |
| Porosity | 40 % |
| Bulk density | 0.65 g/cc |
| Compressive strength | 260 $kg/cm^2$ |
| Surface-to-weight ratio | 1,050 $m^2/g$ |

EXAMPLE 2

A porous carbon product prepared as in Example 1 was machined to give a pipe having an inner diameter of 5 mm and an outer diameter of 25 mm. The pipe was then heated for activation to 850°C for 4 hours in a mixture of steam and argon (steam: Ar of 75:25 by volume) within a quartz glass tube. The physical properties of the activated porous carbon pipe were determined to be as follows:

| | |
|---|---|
| Average diameter of pores | 4.5 $\mu$ |
| Porosity | 41 % |
| Bulk density | 0.67 g/cc |
| Compressive strength | 305 $kg/cm^2$ |
| Surface-to-weight ratio | 1100 $m^2g$ |

EXAMPLE 3

100 parts by weight of hollow carbon micro-spheres as used in Example 1 was intimately mixed with 100 parts by weight, of a 30% caramel solution. The mixture was placed in a metal mold having dimensions of 150 mm × 150 mm × 200 mm and subjected to a pressure of 5 kg/cm$^2$. The molded body was then heated in a dryer, at a heating rate of 3°C/hour, from 50°C to 120°C to completely remove the water therefrom. The body was then heated in a N$_2$ atmosphere, at a rate of 25°C/hour, from 200°C to 850°C and held afterwards, at 850°C for 4 hours to complete the baking and carbonizing steps.

The porous carbon product thus prepared was then machined to produce a pipe having an inner diameter of 5 mm and an outer diameter of 25 mm. The pipe was then immersed in grade 1 reagent nitric acid and then washed with water. The pipe thus treated was then heated from 200°C to 900°C in a N$_2$ atmosphere at a heating rate of 150°C/hour for activation. The physical properties of the activated porous carbon pipe so obtained were found to be as follows:

```
Average diameter of pores    5.1 μ
Porosity                     43 %
Bulk density                 0.62 g/cc
```

```
Compressive strength         230 kg/cm²
Surface-to-weight ratio      1,000 m²/g
```

Examples of the use of the Porous as an Electrode for a Cell

EXAMPLE 4

The activated porous carbon pipe produced in Example 1 was subjected to a water proofing treatment using paraffin and then machined to change the dimensions to an inner diameter of 33 mm and an outer diameter of 45 mm. The carbon electrode thus prepared was then used as an anode in a wet air cell of the same specification as that of the "AWA-60 Type" ammonium chloride wet air cell (JIS C 8503).[1] The "AWA-Type Wet Air Cell" is a cell equipped with a porous active carbon plate serving as the anode, a zinc plate as the cathode, and an aqueous solution of ammonium chloride as the electrolyte, utilizing air as a depolarizer. The performance characteristics for the cell were determined to be as follows:

[1]JIS is the Japanese Industrial Standard.

Performance Comparison

| | Ampere (mA) | Duration (Hr) | Capacity (AHr) | Average Voltage (V) |
|---|---|---|---|---|
| AWA-60 (using the electrode of the present invention) | 100 | 750 | 75 | 1.15 |
| Cell commercially available | 100 | 650 | 65 | 1.00 |

EXAMPLE 5

Two activated porous carbon pipes as were produced in Example 2 were machined to to dimensions of an inner diameter of 10 mm and an outer diameter of 20 mm. One pipe was subjected, in turn, to a nitric acid solution treatment, to the platinum chloride hydrochloric acid treatment and to the neutralization treatment. That pipe was then subjected to a hydrazine treatment to deposit a platinum catalyst on the surfaces of the activated carbon pipe. Finally, the pipe was then waterproofed with paraffin. A second pipe was immersed, in turn, in an osmium tetrachloride solution and then in a hydro-boron sodium solution to deposit a osmium catalyst on the surfaces of the activated porous carbon pipe. This second pipe was also subjected to paraffin treatment to make it water-proof.

A hydrogen-oxygen cell was constructed using a 55% KOH solution as the electrolyte, the first pipe on which was deposited the platinum catalyst as the cathode and the second pipe on which was deposited osmium catalysts as the anode. The performance characteristics for the cell were determined to be as follows:

Performance Characteristics

| Cell | Temperature | Pressure of Fuel Gas | Terminal Voltage | Current Density |
|---|---|---|---|---|
| Hydrogen-oxygen cell (using the electrodes of Example 5) | 60°C | 1 atm | 0.95–1.05V | 10–30mA/cm$^2$ |
| National Carbon Co. - Type hydrogen-oxygen cell* | 60°C | 1 atm | 0.90V | 5.4mA/cm$^2$ |

*A typical hydrogen-Oxygen cell equipped with baked porous carbon electrodes and usable at a lower temperature and under a lower pressure. (cf. "A review of the state of the art and future trend in Fuel Cell system," technical report No. 10, Western Reserve University, Dec. 1, 1958)

EXAMPLE 6

Two activated porous carbon pipes as were produced in Example 1 were respectively coated with platinum and osmium deposited in the same manner as Example 5. A hydrogen-oxygen cell was prepared using the former as a cathode and the latter as an anode. The performance characteristics for the cell thus prepared were determined to be as follows:

Performance Characteristics

| Temperature | Fuel gas pressure | Terminal Voltage | Current Density |
|---|---|---|---|
| 60°C | 1 atm. | 0.91 – 1.0 Volt | 5–25mA/cm$^2$ |

It will be appreciated that changes and modifications in the products and processes described above will become apparent to those skilled in this art, and obvious and equivalent changes are intended to be included in the scope of this invention.

We claim:

1. A porous carbon electrode having an average pore diameter of 0.5 to 20μ, a porosity of 5 to 50%, a bulk density of 0.2 to 0.9 g/cc, a surface-to-weight ratio of 600 to 2,000 m$^2$/g and a compressive strength of 20 to 400 kg/cm$^2$, said electrode comprising hollow carbon micro-spheres dispersed in a carbonized matrix wherein said hollow carbon micro-spheres have grain diameters of 5 to 100μ and wall thicknesses of 0.5 to 25μ.

2. The porous carbon electrode of claim 1 wherein the ratio of said matrix to said hollow carbon micro-spheres is within the range of 5 to 60 % by weight.

3. A porous carbon electrode as defined by claim 1 in the shape of a hollow cylinder.

* * * * *